United States Patent [19]

Schomburg

[11] Patent Number: 4,549,280
[45] Date of Patent: Oct. 22, 1985

[54] APPARATUS FOR CREATING A MULTIPLICATION PIPELINE OF ARBITRARY SIZE

[75] Inventor: John R. Schomburg, New Brighton, Minn.

[73] Assignee: Sperry Corporation, New York, N.Y.

[21] Appl. No.: 451,130

[22] Filed: Dec. 20, 1982

[51] Int. Cl.⁴ .............................................. G06F 11/10
[52] U.S. Cl. .................................................... 364/738
[58] Field of Search ............... 364/738, 754, 757, 758, 364/759, 760

[56] References Cited

U.S. PATENT DOCUMENTS

| | | | |
|---|---|---|---|
| 3,508,038 | 4/1970 | Goldschmidt et al. | 364/757 |
| 3,596,072 | 7/1971 | Iwamoto | 364/738 |
| 3,670,956 | 6/1972 | Calhoun | 364/758 |
| 3,986,015 | 10/1976 | Gooding et al. | 364/738 |
| 4,314,349 | 2/1982 | Batcher | 364/738 |

OTHER PUBLICATIONS

Lai et al., "Logic Networks of Carry-Save Adders", *IEEE Trans. on Computers*, vol. C-31, No. 9, Sep. 1982, pp. 870–882.

Partridge, "Cascade Adder for Multiply Operations", *IBM Tech. Disclosure Bulletin*, vol. 13, No. 8, Jan. '71, pp. 2406–2407.

Primary Examiner—David H. Malzahn
Attorney, Agent, or Firm—Charles A. Johnson; Kenneth T. Grace; Marshall M. Truex

[57] ABSTRACT

A multiply pipeline with parity circuit to be used as a building block in a multiplication pipeline of arbitrary size is disclosed. It includes circuits for generating and checking parity. The parity of the output carries leaving the component chips of the multiply pipeline are explicitly generated internally to those chips. By generating output carry parity on-chip, all single-bit errors except for those caused by on-chip internal gate or metallization faults will be detected. Thus, means are provided for detection of single-bit errors in the multiplication circuitry. The proposed multiply pipeline with parity circuit includes a pair of gate arrays, or chips, which participate as follows. A 6-bit by 6-bit multiply with parity chip is used as a building block in a portion of the pipeline in which all logical products are initially generated, and reduction of these logical products, or partial products, commences. A 6-bit by 4-bit adder/register with parity chip is used as a building block in subsequent sections of the pipeline, which are used to further reduce the partial products. This latter chip type also contains a latch register to provide orderly and controlled staging of the intermediate partial products.

14 Claims, 15 Drawing Figures

FIG. 7

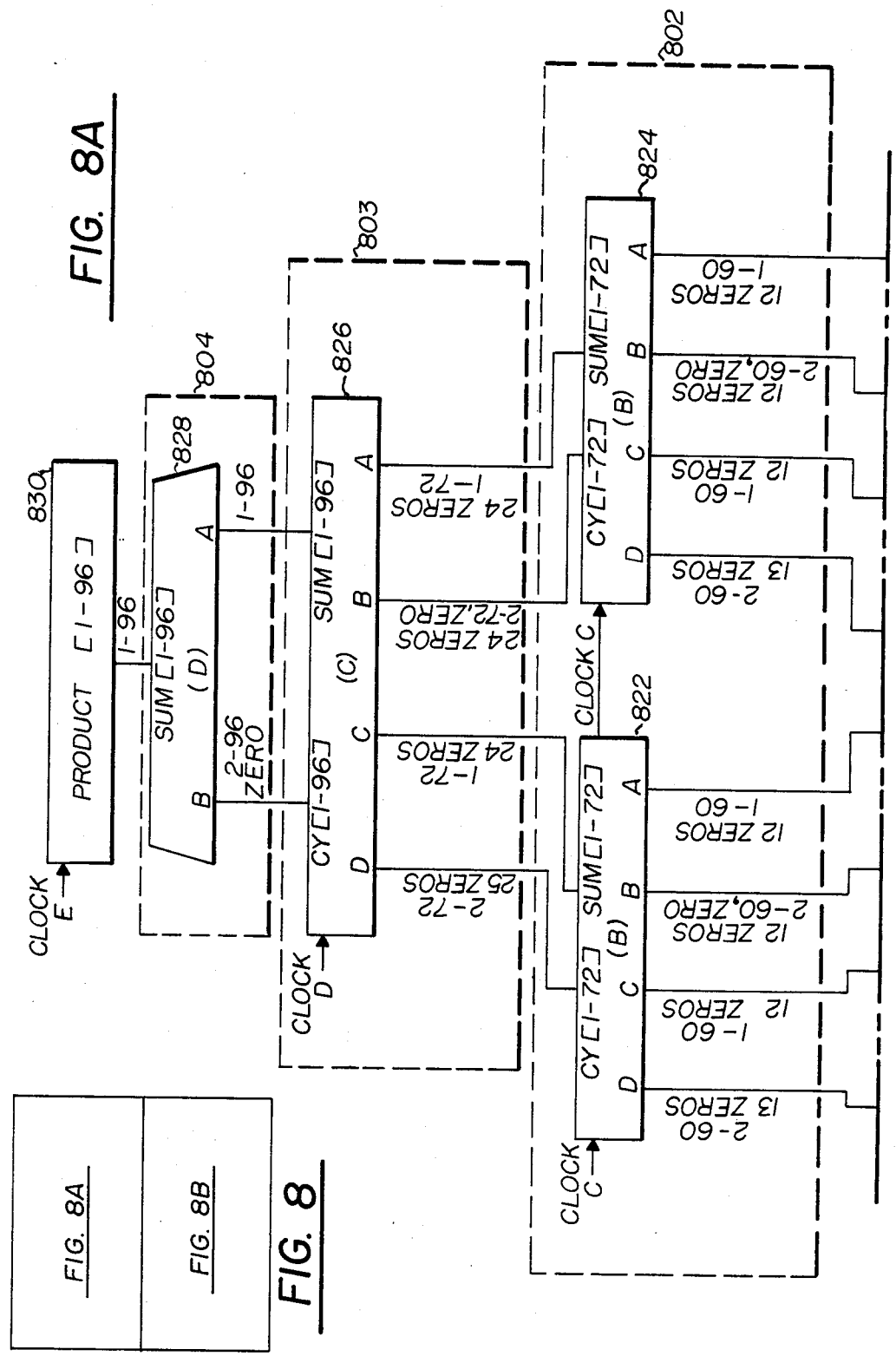

APPARATUS FOR CREATING A MULTIPLICATION PIPELINE OF ARBITRARY SIZE

BACKGROUND OF THE INVENTION

A. Field of the Invention

This invention relates to a multibit multiplier which increases performance for the multiply operations of a large scale processor by providing a building block which may be used in a multiplication pipeline of arbitrary size.

B. Prior Art

In the past, multiplication was most often performed in digital data processors by repetitively adding the multiplicand to itself the number of times indicated by the multiplier. As speed increased, this repetitive addition by the machine's adder gave way to the use of individual multiplier circuits. Today, most contemporary large scale processors utilize specialized networks to accomplish faster multiply operations. These networks are designed to simultaneously process several multiplier bits. Further, a number of specialized algorithms have been developed to simplify the logic used in the building of these arrays. Generally, this simplification involves the decoding of multiplier groups and interaction between the multiplier groups to control the array.

This approach, of course, complicates the control aspect, while simplifying the array. Such arrays are commonly built of a combination of adders and multiplexers, with multiplier decoders used for control. The adders used may be of the conventional type or they may take the carry/save form.

Another common feature in past digital data processors has been the inclusion of error detecting networks in all data paths of the machine. However, present day large scale integrated (LSI) devices do not provide for the inclusion of these error detecting networks in the usual manner. This leaves duplication and result comparison as the only available method of error detection for these LSI devices.

One specific earlier example of a fast multiplier was suggested in the article published in *IEEE TRANSACTIONS ON ELECTRONIC COMPUTERS* in an article by C. S. Wallace, entitled "A Suggestion for a Fast Multiplier", on pages 14–17 of the February, 1964 issue. The article suggests that the economics of large scale scientific computers of that day could benefit from greater investment in hardware to mechanize multiplication that was common in computers of a still earlier vintage.

Multiplication of binary fractions is normally implemented as the addition of a number of summands, each some simple multiple of the multiplicand, chosen from a limited set of available multiples on the basis of one or more multiplier digits. No good reason is known to depart from this general scheme. Acceleration of the process must then be based on one or more of the following expedients: (1) reduction in the number of summands; (2) acceleration of the formation of summands; (3) acceleration of the addition of summands. Acceleration of addition will be discussed initially.

The basic addition processes usually employed in computers add two numbers together. The possibility exists of adding together more than two numbers in a single adder to produce a single sum. However, the logical complexity of the adder required appears to grow quite disproportionately to the resulting increase in speed, consequently there appears to be no advantage in trying to sum even three numbers at a time into a single sum.

Another expedient, now quite commonly used, is to employ a pseudoadder which adds together three numbers, but rather than producing a single sum, produces two numbers whose sum equals that of the original three. In the context of the basic problem of adding together many summands, one pass through such an adder reduces the number of summands left to be summed by one, as does a pass through a conventional adder. The advantage of the pseudoadder is that it can operate without carry propagation along its digital stages and hence is much faster than the conventional adder. Thus, rather than allowing the possibility of a carry propagation from the lowest-order digit to the highest-order digit, carry propagation is allowed only to the next-highest-order digit. A simple form for such an adder is a string of full adder circuits of the normal sort, where the carry inputs are used for the third input number, and the carry outputs for the second output number. In multiplication, one pseudoadder is usually used, and storage is provided for two numbers. On each pass through the adder, the two stored numbers and one multiple of the multiplicand are added, and the resulting two numbers returned to storage.

In any scheme employing pseudoadders, the number of adder passes occurring in a multiplication before the product is reduced to the sum of two numbers, will be two less than the number of summands, since each pass through an adder converts three numbers of two, reducing the count of numbers by one. To improve the speed of the multiplication, one must arrange many of these passes to occur simultaneously by providing several pseudoadders.

Assuming that all summands are generated simultaneously, the best possible first step is to group the summands into threes, and introduce each group into its own pseudoadder, thus reducing the count of numbers by a factor of 1.5 (or a little less, if the number of summands is not a multiple of three). The best possible second step is to group the numbers resulting from the first step into threes and again add each group in its own pseudoadder. By continuing such steps until only two numbers remain, the addition is completed in a time proportional to the logarithm of the number of summands.

Successive steps may use the same set of pseudoadders (using progressively fewer of the set in each step) by using temporary storage registers for the outputs of the pseudoadders. However, if we used separate adders the equipment cost is little, if at all increased, since the additional pseudoadders required will not need many more components than the flip-flop registers eliminated, and the control circuitry is greatly simplified. Further consideration of this approach will reveal that the purely combinational adder would have a considerable speed advantage. In the simplest form of multiplication, there are as many summands as multiplier digits, each either 0 or 1 times the multiplicand. A wide range of schemes involving recoding the multiplier into a new (possibly redundant) form using some negative digits have been developed to reduce the number of summands. Since all summands are to be generated simultaneously, and then summed very quickly, it is desirable that the recoding scheme used should (1) require only multiples of the multiplicand obtainable by shifting and complementing, and (2) be a local recoding in which each recoded digit depends only on a small group of original multiplier digits. The best system found gives base-four recoded multiplier digits which can be +2, +1,0, −1 or −2, and each is determined entirely by three adjacent original binary multiplier digits. Considering the process as a base-four recoding, digits 0, 1, 2, 3 are recoded into digits 0, 1, −2, −1, respectively, if the next less significant original base-four digit is 0 or 1, and into 1, 2, −1,0 if the next less significant original digit is 2 or 3. The number of summands is half the number of binary multiplier digits. Attempts to reduce the number further appear to require multiples not obtainable by shifting. Some complications arise in the pseudoadder structure because of the negative multiplier digits, which, in a two's complement system, require correction digits to be added in. However, detailed examination shows that these problems are surmountable without loss of speed of undue circuit cost.

Additional schemes for parallel multipliers which are based on different principles and having some advantages over those presented above by C. S. Wallace, have been proposed by L. Dadda in his article entitled *Some Schemes for Parallel Adders* published in "Alta Frequenza" in March 1965 at pages 349 to 356.

In his conclusions, Mr. L. Dadda suggests that having established the possibility of a parallel digital multiplier, some considerations can now be made about the important aspects of speed and cost than can be encountered in a practical design.

He suggests that if one assumes that a third of all arithmetic operations in scientific computers are multiplications and that these, at present, take about four times as long as additions, the use of a fast multiplier allowing a multiplication in a memory cycle time, would approximately double the speed of computation.

There is therefore a chance that a parallel multiplier could become a convenient means to improve the value of a computer, owing to the fact that its cost can be shown to be only a few percent of the total computer cost.

Let us first note that the total multiplication time is composed of two parts: the first is the time elapsed from the application of the signals representing the two factors to the inputs of the multiplier, to the availability of the inputs to the carry-propagating adder; the second part is the delay proper of the adder, mainly consisting in the carry propagation delay.

In the design of a practical multiplier, one can assume as a goal to obtain a total delay equal or less than the cycle time of the high-speed memory, so that the computer can work at its maximum speed, limited only by the memory speed. The choice of the type of circuits depends therefore on the memory cycle time of present day computers. The increasing use of large scale integration appears to suggest it as the prime path for multipliers as well.

Among the different type of full adders, the most suitable for the application in parallel multipliers, from the point of view of economy and speed, are those which require input variables of one form only (natural or complemented), so that output variables of the same form only must be generated. If such condition is satisfied, outputs of one stage can be used directly as inputs to the next stages, without the need of inverters, leading in general to a considerable saving in components and to a reduction of stage delay.

It must be noted that the above restriction can be partially relieved by allowing the use of counters producing outputs of only one form but different from the input's form.

Another similar multiplier circuit is disclosed in copending U.S. patent application Ser. No. 387,644, now U.S. Pat. No. 4,523,210 entitled "Fast Error Checked Multibit Multiplier", by Glen R. Kregness filed June 8, 1982 and assigned to the present assignee. The differences and improvements in the present application will be more clearly understood as one reads and understands the present description. However, generally that earlier application is primarily concerned with the use of a gated carry/save network. Through the use of that network, the need for the decoding of the multiplier bits was eliminated. Although the array itself is increased in complexity, the multiplexers required by earlier systems have been eliminated. In addition, interaction between multiplier groups is no longer required. The net effect is a reduction in logic with faster operation because of the elimination of the decoding.

Even though it is well known, indeed, that many important features of today's fast computers depend on the fact that during operations that last longer than one memory cycle (typically, during multiplication or division) memory can be made available for other operations (e.g. input-output) it is still desirable to process in parallel. Thus, a unique approach for the construction of an LSI multiplier will now be described which provides a unique logic block for use in creating a multiplication pipeline of arbitrary size.

BRIEF DESCRIPTION OF THE INVENTION

A. Objects

Accordingly it is an object of this invention to provide an improved multiplier network for use in a large scale digital data processing system.

It is another object of this invention to provide a square slice of the parallelogram of the logical products formed in a binary multiplication which may be used as a building block in a binary digital multiplier circuit.

It is still another object of this invention to provide a building block for use in a binary digital multiplier circuit wherein all logical products are formed simultaneously before application to the reduction (summing) circuitry.

It is still a further object of this invention to provide a binary digital multiplier logical building block which is capable of generating and reducing the number of logical products occurring on a particular circuit chip, thereby not only minimizing delays but the number of latches required as well.

It is also an object of this invention to provide a binary digital multiplier logical building block circuit chip which does not perform latching on the chip to thereby maximize available reduction (summing) operations.

It is still another object of this invention to provide a binary digital multiplier logical building block in which the parity of all carries is provided internally for increased error detection capability.

It is another object of this invention to provide a logical building block for use in a binary digital circuit which reduces four summands to two summands and latches the result thereof.

It is also an object of this invention to provide a logical building block for use in a binary digital circuit wherein latches are provided at the adder outputs to thereby eliminate chip cross delay.

It is also an object of this invention to provide an adder tree register with parity gate array wherein the carries do not ripple more than one bit position thus minimizing propagation delay.

B. Summary of the Invention

A logical building block for use in a binary digital multiplier circuit is disclosed wherein the logical building block may be used to create a multiplication pipeline with parity, which pipeline may be of arbitrary size. The multiply pipeline with parity configuration includes circuits for generating and checking parity. The parity of the output carries leaving the component chips of the multiply pipeline are explicitly generated internally to those chips. By generating output carry parity on-chip, all single-bit errors except for those caused by on-chip internal gate or metallization faults will be detected. Thus, means are provided for detection of single-bit errors in the multiplication circuitry. The proposed multiply pipeline with parity circuit includes a pair of gate arrays, or chips, which participate as follows. A 6-bit by 6-bit multiply with parity chip is used as a building block in a portion of the pipeline in which all logical products are initially generated, and reduction of these logical products, or partial products, commences. A 6-bit by 4-bit adder/register with parity chip is used as a building block in subsequent sections of the pipeline, which are used to further reduce the partial products. This latter chip type also contains a latch register to provide orderly and controlled staging of the intermediate partial products.

BRIEF DESCRIPTION OF THE SEVERAL FIGURES OF DRAWING

The foregoing objects and the summary will be more readily understood when read in conjunction with the accompanying drawings in which:

FIG. 1 illustrates a block diagram of the multiplier implementation.

FIG. 2 presents the detailed block diagram of the 6×6 multiply with parity gate array used in the multiplier of FIG. 1.

FIG. 3 functionally illustrates an individual carry/save adder used in the logical diagram of FIG. 2.

FIG. 4 pictorially illustrates the function of the 6×6 multiply with parity gate array.

FIG. 5 shows the detailed logical block diagram of the 6×4 adder tree/register with parity gate array used in the multiplier of FIG. 1.

FIG. 6 includes FIGS. 6A, 6B, 6C, 6D and 6E, positioned as shown, and taken together they illustrate the detailed logical interconnection of the 6×6 multiplier gate array and the 6×4 adder tree/register gate array to form a 12-bit by 12-bit multiplier.

Figure 7:
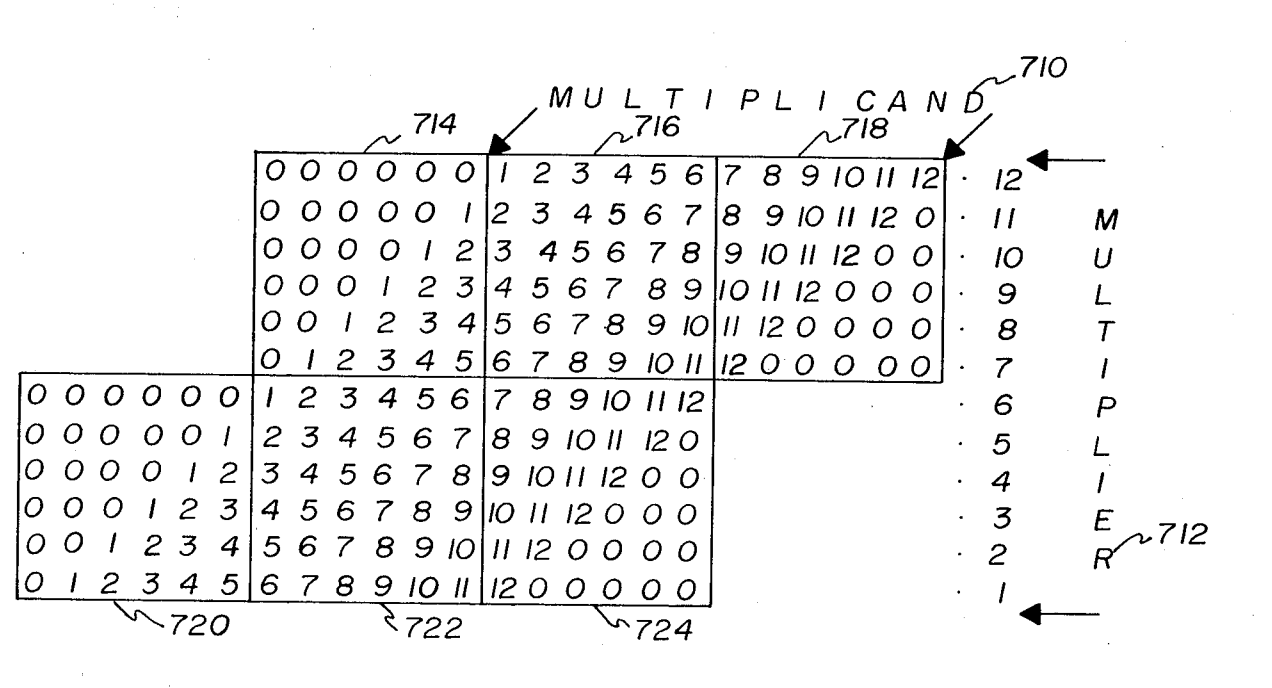

FIG. 7 presents a table showing the formation of logical products in the 6×6 multiplier gate arrays for the multiplier of FIG. 6.

FIG. 8 includes FIGS. 8A and 8B, positioned as shown, and taken together they diagram the use of 12-bit by 48-bit multipliers, adder tree/registers.

DETAILED DESCRIPTION OF THE PREFERRED EMBODIMENT OF THE INVENTION

Figure 1:
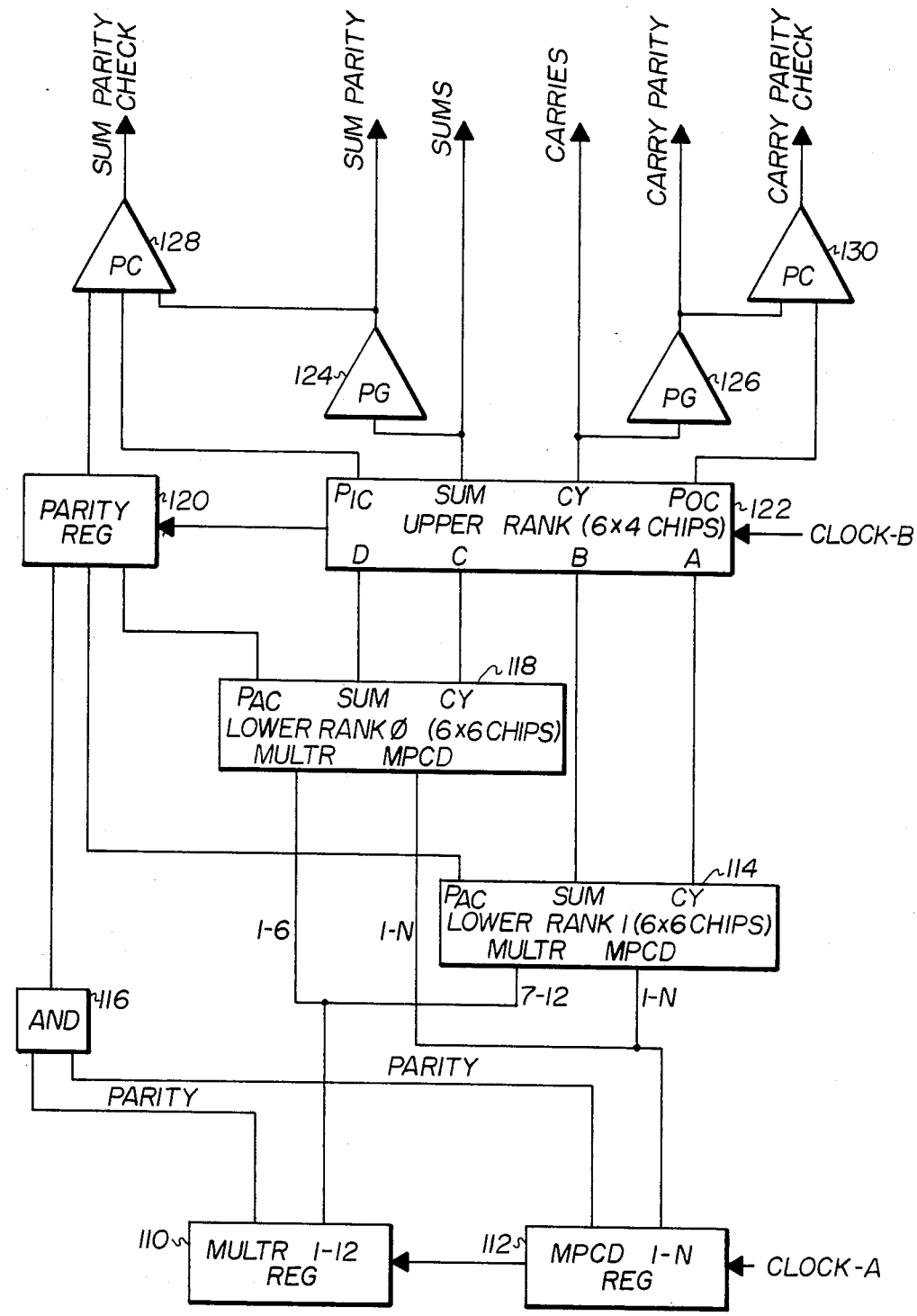

The following detailed description will be more easily comprehended when it is read with reference to the foregoing drawings in which like reference characters symbolize corresponding parts.

FIG. 1 shows a simplified block diagram of a 12-bit by n-bit multiplier. The value of n is assumed to be a multiple of six, which may be achieved by appending zeros onto the data which is to be used as the multiplicand. The inputs to the multiplier consist of a 12-bit multiplier held in the Multiplier Register 110, and a n-bit multiplicand, held in the Multiplicand Register 112. These registers are clocked simultaneously via clock signal A. The bits in these registers are numbered starting at 1, from left to right. The main outputs of the multiplier consist of a n+12 bit Sums word and a n+12 bit Carries word. These two outputs, when added together after shifting the Carries left one position, will form the desired product. Parity information is included with all input and output data and parity checking of the multiplier is performed.

Each of the lower ranks ($\phi$ and 1) 114 and 118, of the multiplier consists of 6-bit by 6-bit multiplier chips, numbering n/6+1 chips. The outputs of these ranks 114, 118 consist of Sums and Carries similar in principal to the overall multiplier outputs, and combined Parity of the Internal, (PIC) and Output (POC) Carries. Internal carries are any carries produced in the process of reducing the summands by addition, but which are not accessible to the pins of the individual chips because of pin limitations.

The Upper Rank 122 of the multiplier consists of 6-bit-wide by 4-bit adder/register chips, numbering n/6+2 chips. This rank 122 reduces the four inputs from the lower ranks 114, 118 to the Sums and Carries which form the final product, and it also produces the Parities of the Internal (PIC) and Output (POC) Carries separately for error detection.

Lower rank $\phi$, 118 is fed the most significant six bits of the Multiplier, bits 1 through 6, and Lower Rank 1, 114 is fed the least significant six bits of the Multiplier, bits 7 through 12. The entire Multiplicand 112 is fed to both of the Lower Ranks 114, 118.

When the Sum and Carry outputs of the Lower Ranks 114, 118 are connected to the Upper Rank 122, the Carries must be logicaly left-shifted by one bit position relative to the Sums. In addition, the Sum and Carry outputs of Lower Rank $\phi$, 118 must be connected to the Upper Rank 122 six bit positions to the left relative to the respective Lower Rank 1, 114 connections.

The scheme used for error detection and parity generation will now be described. Let p(x) represent the parity of x, * represent the logical AND operator, and $\oplus$ represent the logical exclusive-OR operator. Equations for parity generation are developed as follows.

For the outputs of Lower Ranks $\phi$ and 1:

P(Sum $\phi$) = P(Multr[1–6])*P(Mpcd)$\oplus$P(IC $\phi$)
P(Carry $\phi$) = P(OC $\phi$)
P(Sum 1) = P(Multr[7–12])*P(Mpcd)$\oplus$P(IC 1)
P(Carry 1) = P(OC 1)

where Multr stands for Multiplier, Mpcd for Multiplicand, IC for Internal Carries and OC for Output Carries.

For the Upper Rank, and overall parity:

P(Sum) = P(Sum $\emptyset$)$\oplus$P(Carry $\emptyset$)$\oplus$P(Sum 1)$\oplus$P(Carry 1)$\oplus$P(IC)
= P(Multr) * P(Mpcd)$\oplus$P(IC $\emptyset$)$\oplus$P(OC $\emptyset$)$\oplus$P(IC 1)$\oplus$P(OC 1)$\oplus$P(IC)
= P(Multr) * P(Mpcd)$\oplus$P(AC 0)$\oplus$P(AC 1)$\oplus$P(IC)

-continued

P(Carry) = P(OC)

where AC stands for combined Internal and Output Carries.

The parity of any of the carries, internal or external, is not readily predicted, and is instead generated directly from the carries inside each chip. External parity generators 124, 126 are labeled PG in FIG. 1, and parity checkers 128, 130 which detect single bit errors, are labeled PC. The PC and PG functions are logically identical, and are circuits which perform multiple-bit exclusive-OR functions.

Figure 2:
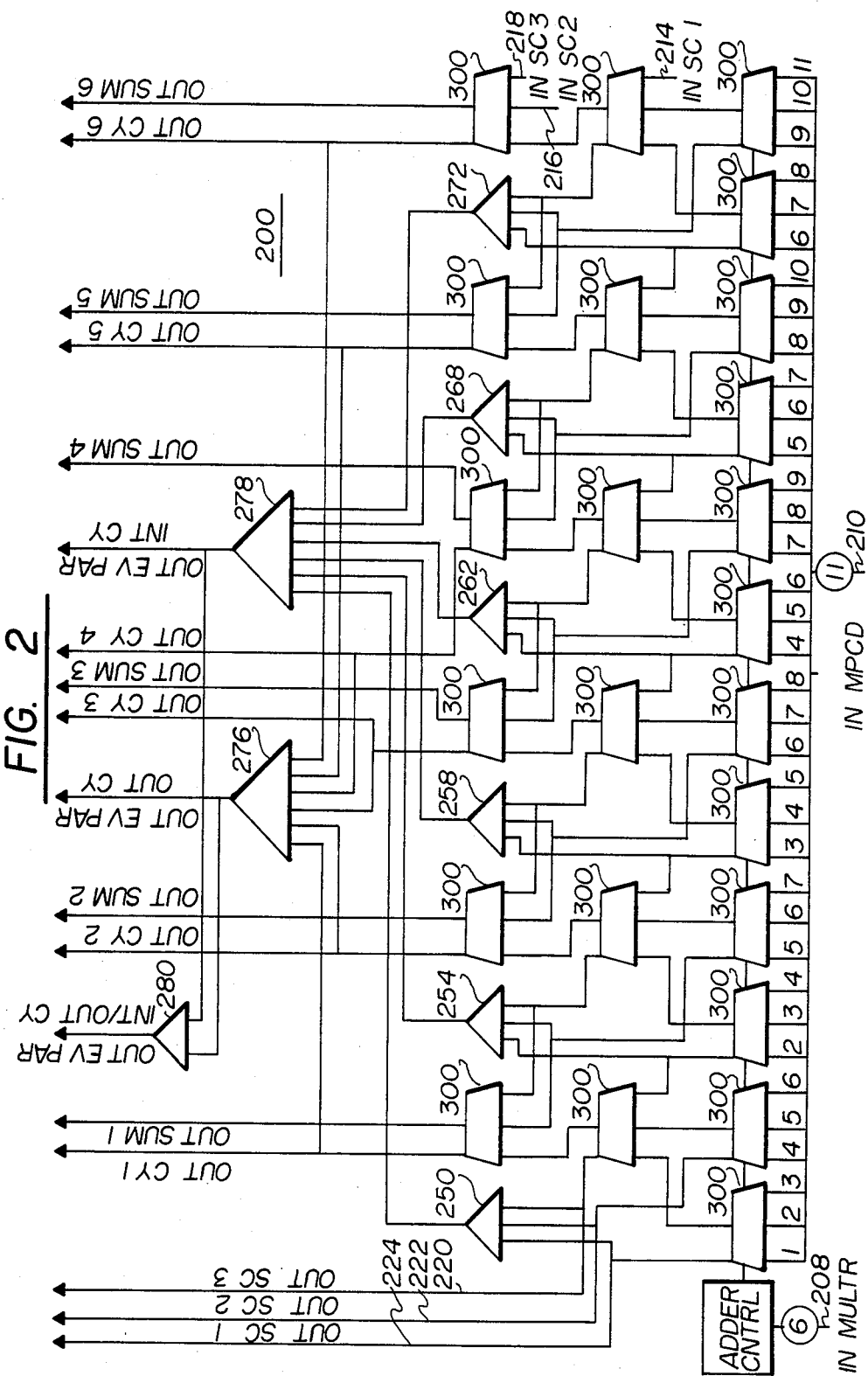

FIG. 2 shows the internal structure 200 of the 6-bit by 6-bit multiply circuits which are used to build structures 114, 118 of FIG. 1. The triangular structures 250, 254, 258, 262, 268, 272, 276, 278 and 280 represent parity generators with the same function as in the previous discussion. These circuits are well known in the art and require no further discussion. The trapezoidal structures 300 represent carry-save adders, each of whose function will be later described in conjunction with FIG. 3.

In the simplest form of binary multiplication, as in ordinary pencil-and-paper decimal multiplication, the entire multiplicand is multiplied by each digit of the multiplier. This causes the formation of as many partial products as there are digits in the multiplier. In binary multiplication, the multiplicand is merely copied for non-zero multiplier bits, and all zeros are copied for multiplier bits equal to zero. When the resulting partial products are arranged in a column with respect to the order of the multiplier bits used and in such a manner that all of the bits in a column have the same mathematical weight, a parallelogram is formed, the sum of whose rows produce the desired product.

The circuit of FIG. 2 generates a 6-bit by 6-bit square of this parallelogram for binary multiplication, and reduces the six rows to two rows termed sums and carries using the network of carry-save adders. There are six columns of four carry-save adders each. The partial product bits are all formed at the inputs to the lowest row of the carry-save adders via AND gates at each adder input. These are not explicitly shown in FIG. 2, but are implied by the structure labeled Adder Control 212. The bits being AND-ed at each input will be later detailed in FIG. 4.

The man inputs to the circuit chip are the 6-bit Multiplier 208 entering Adder Control 212 which implies the generation of six rows of partial products, and the 11-bit Multiplicand 210. Eleven bits are required since eleven different Multiplier bits participate in a 6-bit wide slice of the partial product parallelogram as the Multiplicand is left-shifted five times. This is also illustrated in FIG. 4.

The main outputs of the circuit chip are six Sum bits, (noted as out sum 1 through out sum 6) and six Carry bits, (out cy1 through out cy6). When added together as shown in the lower portion of FIG. 4 below the summation bar, along with the Stage Carries to be discussed later, these form the sum of the six original rows of partial products.

Figure 3:
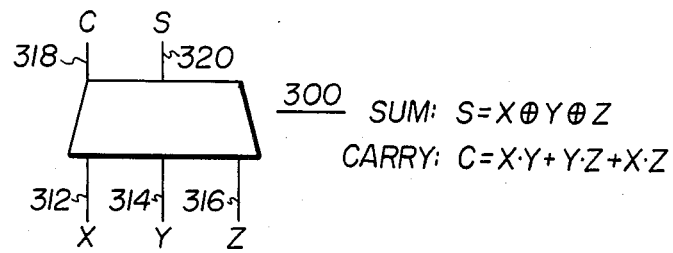

FIG. 3 illustrates the function of a single carry-save adder 300. The function of this structure is to add together three input bits of equal weight x, y, and z to produce a two-bit output sum. The most significant bit of this sum is termed the Carry bit, and the least significant bit is termed the Sum bit. Generalized Boolean equations for these bits are also shown in FIG. 3.

Figure 4:
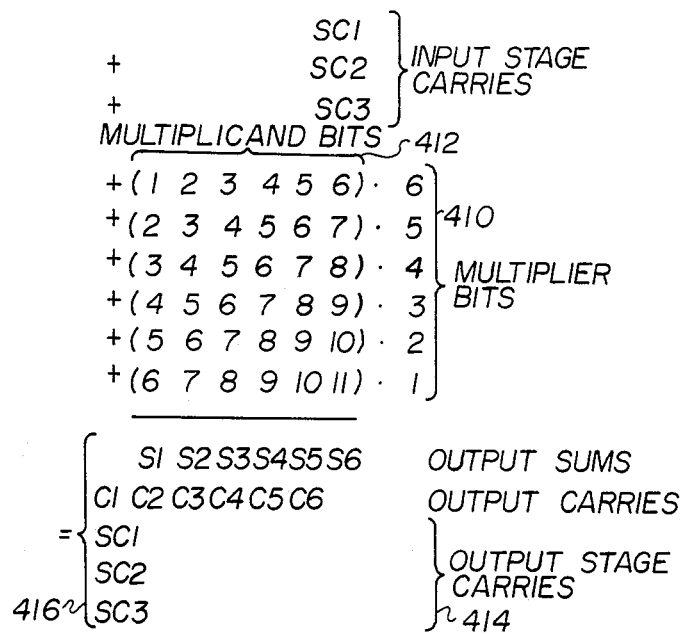

As shown in FIG. 4, each column of four carry-save adders reduces a column of six partial product bits to two bits, a Sum and a Carry Sn, Cn. Internal carries are allowed to propagate only to the next-highest order column when passing through each of the three ranks of adders in the circuit chip. Carries leaving the highest-order column and entering the lowest-order column are termed Stage Carries. These are provided as pins on the circuit chip to allow unlimited extension of the three adder ranks for wider multiplicands. The parity of the internal carries and output stage carries, the parity of the output carries, and their combined parity is also generated and sent to output pins for error checking.

As previously stated, the function of the 6-bit by 6-bit multiplier chip is illustrated in FIG. 4. The generation of the 6-bit square slice of the partial product parallelogram is also shown in FIG. 4. The Multiplier and Multiplicand bits are numbered to correspond with FIG. 2. Each Multiplier bit is AND-ed with each of the Multiplicand bits on its row. FIG. 4 illustrates the manner in which the output Sums, Carries, and Stage Carries are aligned before addition to produce the sum of the six partial product rows.

Figure 5:
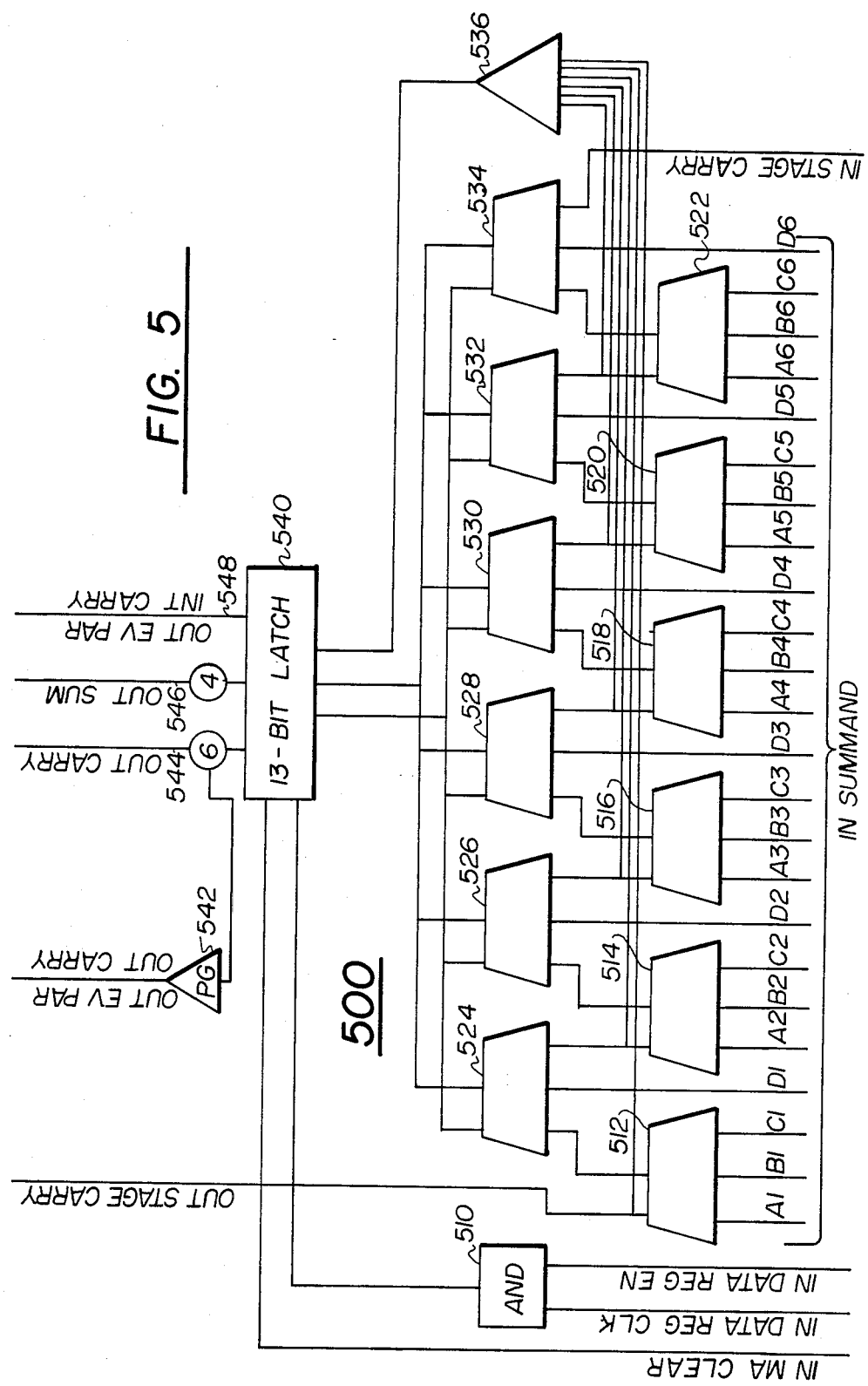
Figure 6B:
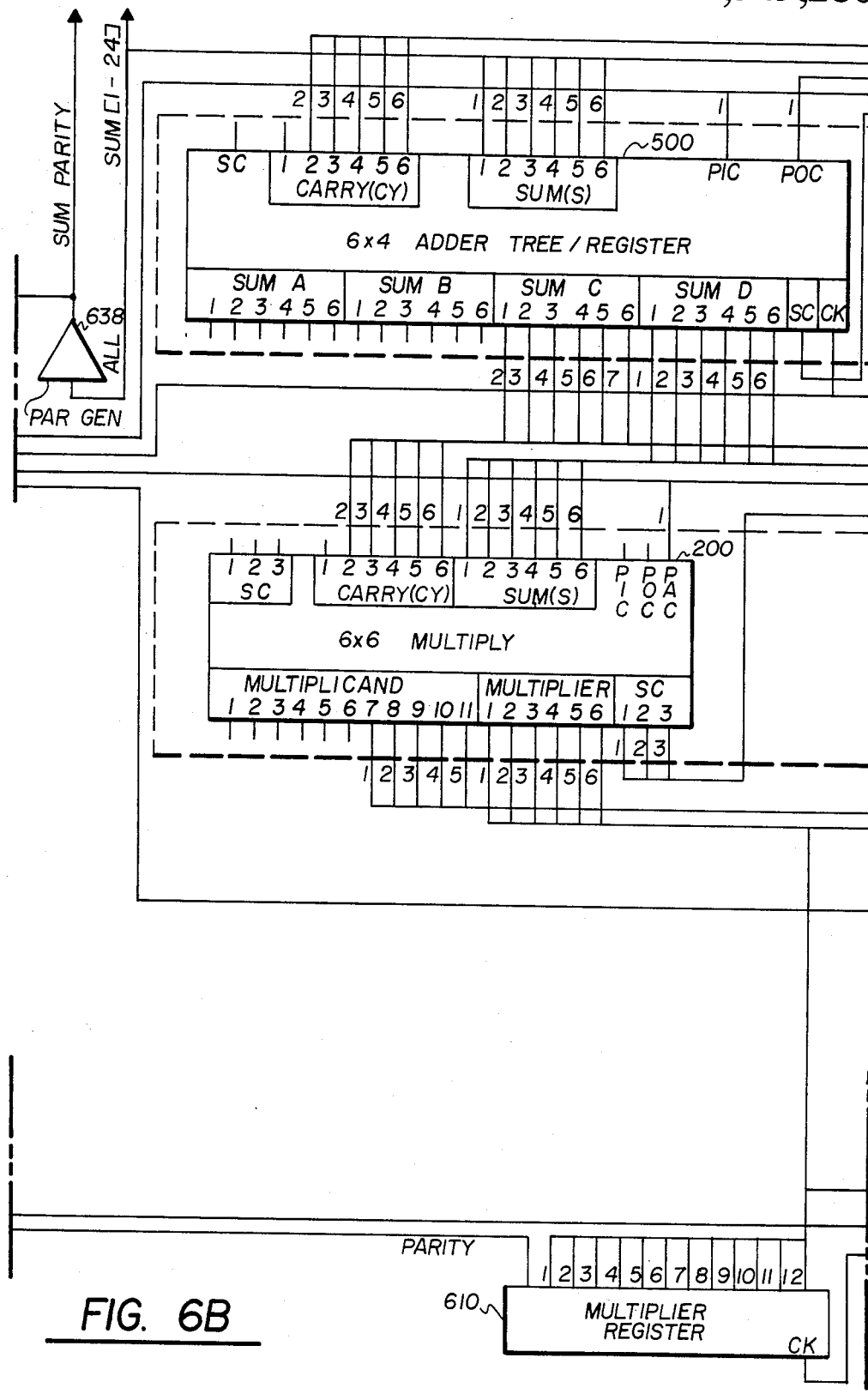
Figure 6C:
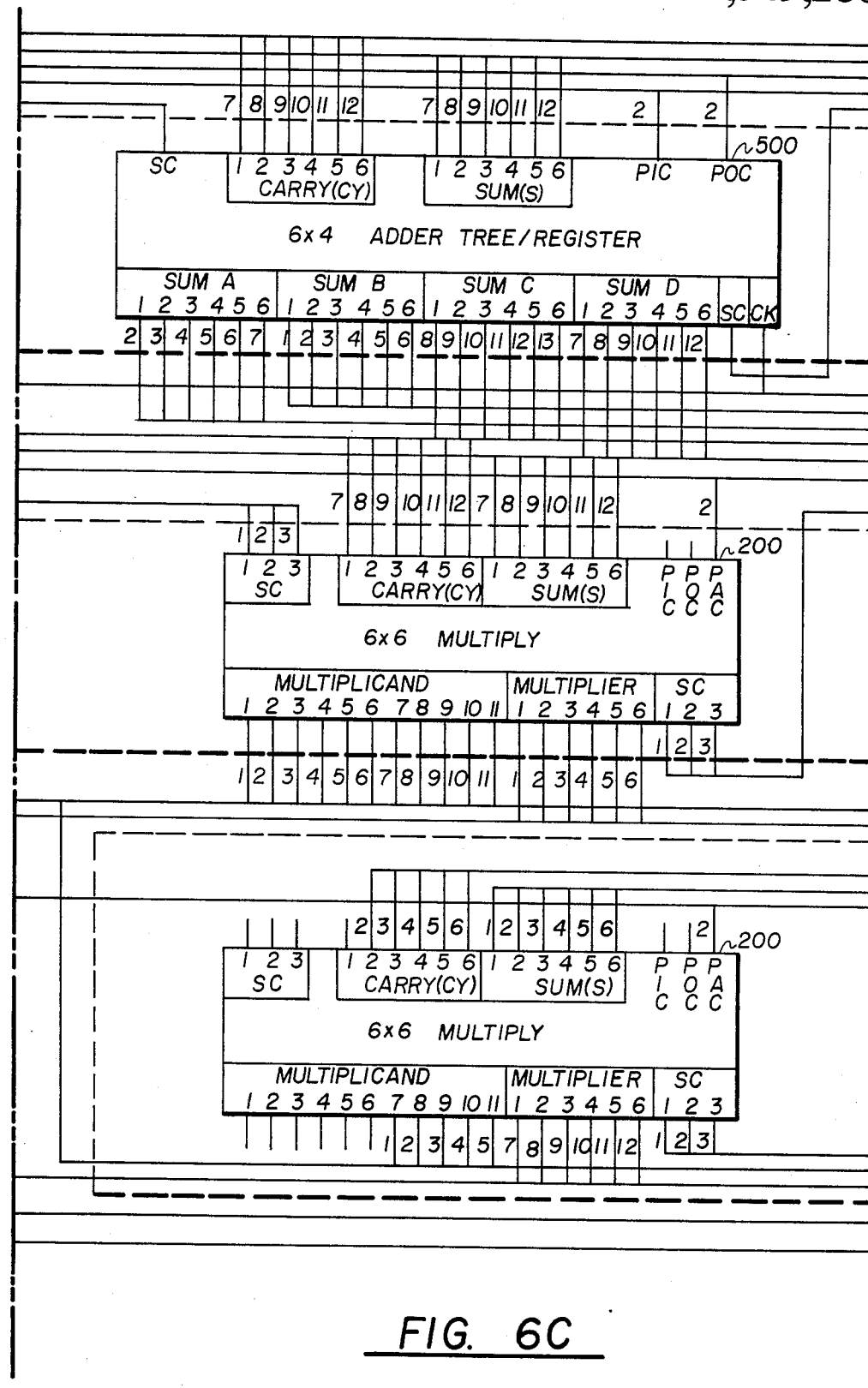
Figure 6D:
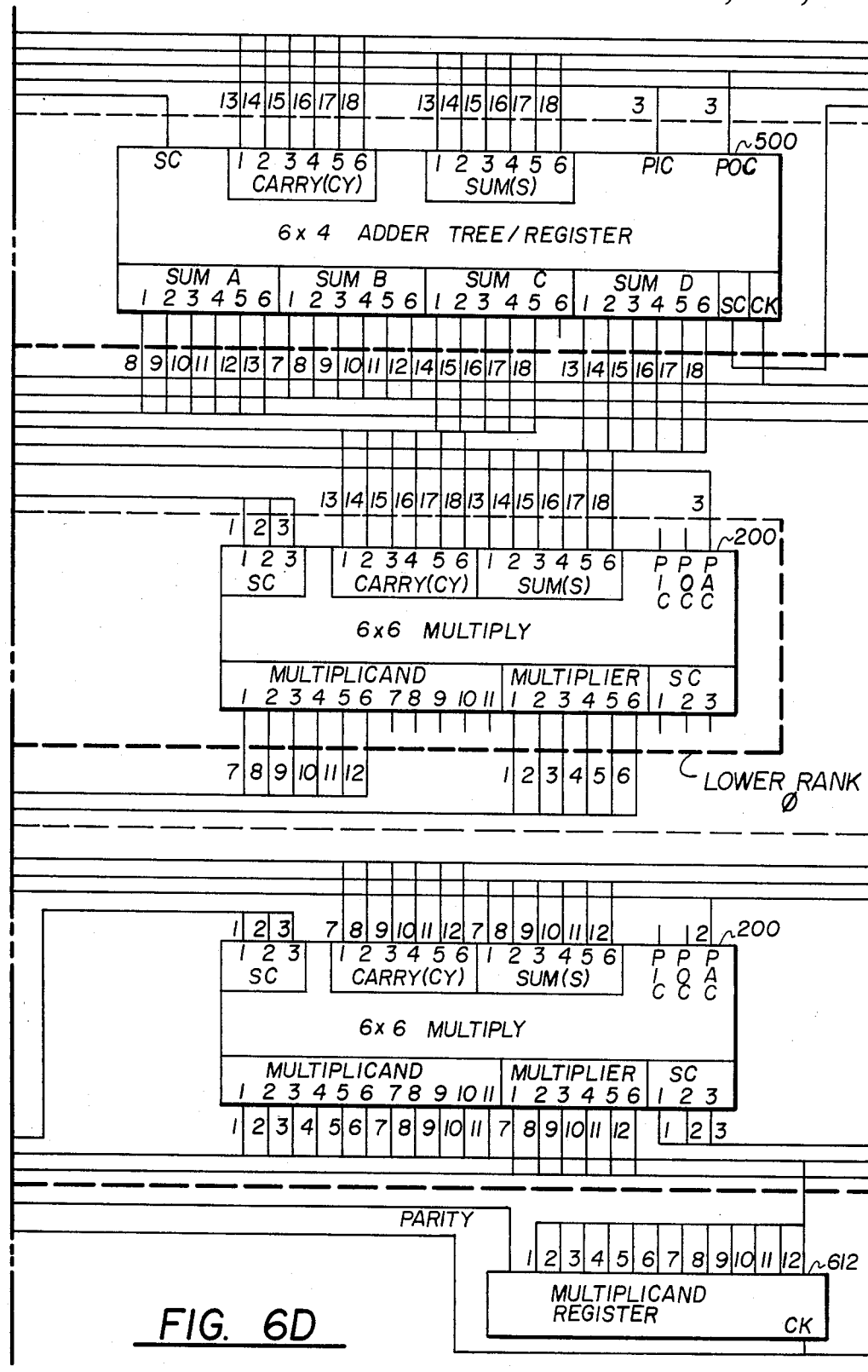
Figure 6E:
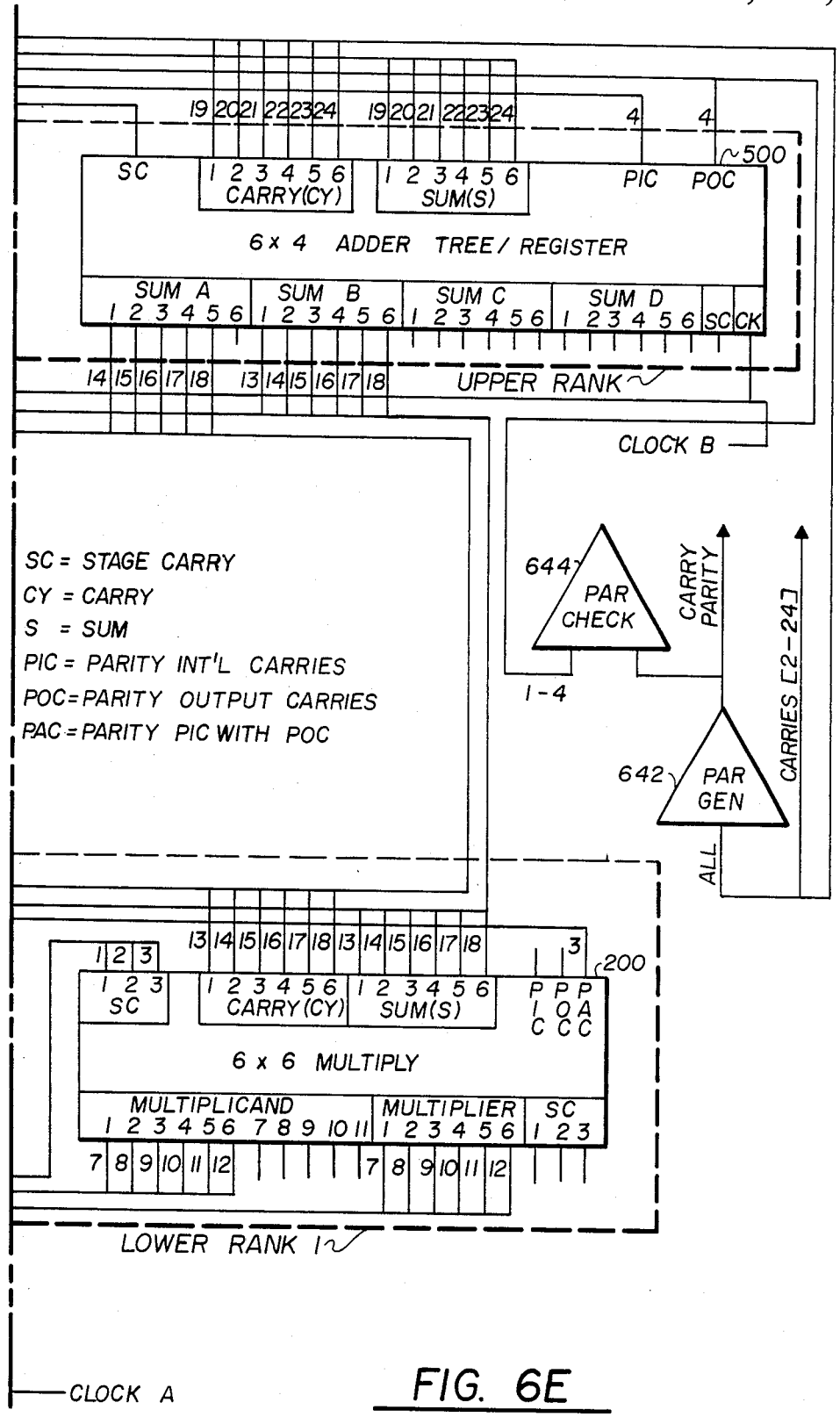

FIG. 5 shows the internal organization of the 6-bit wide by 4-bit adder/register circuit chip 500. This circuit chip 500 reduces four summands A, B, C, and D to two numbers, also termed Sums and Carries, using a network of carry-save adders 512 to 534, as in the multiplier circuit chip. In this case, only four rows A, B, C and D of data are being reduced, so that two ranks of adders are sufficient. Again, carries from the lower rank are allowed to propagate only to the next highest-order column of adders.

Carries leaving the first rank of adders from the highest-order column 512 and entering the second rank of adders in the lowest-order column 534 are termed Stage Carries. Pins are provided for the Stage Carries to allow unlimited extension of the adder/register structure.

As previously discussed, the main inputs to the adder/register chip 500 are the four Summands, named A, B, C, and D, each consisting of six bits numbered 1–6. The like-numbered bits of each Summand are applied to the same column of adders. The outputs of the second rank of adders 524, 526, 528, 530, 532 and 534 are six sum bits and six carry bits which are captured in twelve bits of a latch register 540 located on the circuit chip.

Parity of the internal carries and the output Stage Carry is generated and latched in the remaining bit of the 13-bit latch register 540.

The main outputs of the circuit chip are the Sum and Carry output signals and the parity of the output Carries which is generated on the circuit chip directly from the register outputs via parity generator 542. The Sum and Carry outputs 544, 546 and internal carry parity 548 come directly from the latch register 540.

Figure 6:
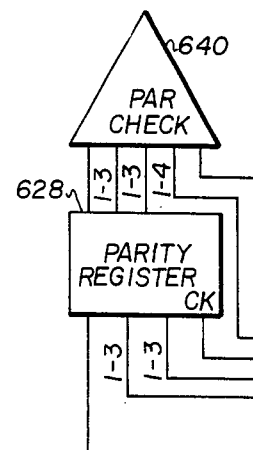
Figure 6:
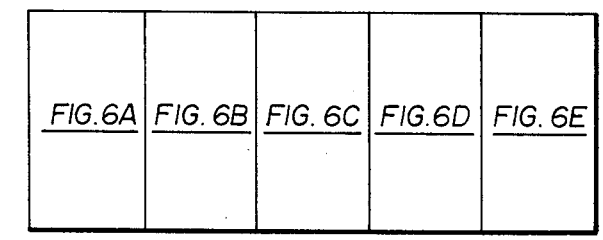
Figure 6A:
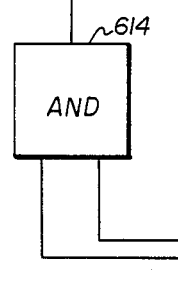

FIG. 6A through FIG. 6E, when arranged as shown in FIG. 6, illustrates the detailed interconnection of the Multiplier 610 and Multiplicand 612 registers, the two Lower Ranks of 6-bit by 6-bit multiplier chips 200, the Upper Rank of 6-bit by 4-bit adder/register chips 500, and external error detection gating necessary to build a 12-bit by 12-bit multiplier. To form the resulting 24-bit product, a 24-bit full binary adder may be used to add the output Sums from the Upper Rank to the left-shifted output Carries from the Upper Rank. This adder is not shown.

checked using a parity checker (PC). These functions are logically identical, and are exclusive-OR functions.

The lower level gate array forms a six bit by six bit square slice of the parallelogram of logical products formed in a binary multiplication. Inputs include 11 bits of multiplicand and six bits of multiplier; outputs include a six bit sum word and a six bit carry word. Internal to the circuit chip is a tree of carry/save adders. Logical products are formed at the inputs to a first rank of carry-save adders. Stage carry inputs and outputs for extending the carry-save adder array beyond circuit chip boundaries are provided. The parity of the internal carries, output carries and their combination are provided for error checking.

We have also illustrated the upper level circuit chip referred to earlier which is the 6×4 adder tree register with parity gate array. This circuit chip reduces four six-bit summands to two six-bit outputs. Inputs include four six-bit summands: A1-A6, B1-B6, C1-C6 and D1-D6. Outputs include a six-bit sum with a six-bit carry. The circuit consists of a six-bit wide, four-bit deep carry-save adder tree followed by a latch which captures the six-bit sum and six-bit carry outputs of the adder tree and the parity of the carries generated in the adder tree.

The internal carry parity (latched) and the output parity (taken from the latch outputs) are again provided for error checking.

It will be understood from the foregoing description that various modifications and changes may be made in the preferred embodiment of the present invention without departing from its true spirit. It is intended that this description is for purposes of illustration only and should not be construed in the limiting sense. The scope of this invention should be limited only by the language of the claims.

What is claimed is:

1. A multiply pipeline building block with parity checking capabilities comprising:
   a. a multiplicand register;
   b. a multiplier register;
   c. multiple ranks of multiply gate arrays each rank connected to said multiplicand register and to said multiplier register;
   d. a single rank of adder tree/register gate arrays connected to each of said multiple ranks of multiply gate arrays;
   e. a first parity generating means and a second parity generating means each connected to said single rank of adder tree/register gate arrays;
   f. a first parity checking means and a second parity checking means, said first parity checking means connected to said first parity generating means and to said single rank of adder tree/register gate arrays and said second parity checking means connected to said second parity generating means and to said single rank of adder tree/register gate arrays; and
   g. said first parity checking means further coupled to said multiplicand register, and to said multiplier register, and to each of said multiple ranks of multiply gate arrays to provide circuitry for receiving parity signals there from and for checking parity within the multiply pipeline building block and thereby internally detecting single-bit errors.

2. The multiply pipelined building block as set forth in claim 1 wherein each gate array in said multiple ranks of multiply gate arrays are identical gate arrays of a first gate array type and each gate array in said single rank of adder tree/register gate arrays are of a second gate array type.

3. The multiply pipeline building block as set forth in claim 2 wherein each of said multiple ranks of multiply gate arrays of identical first gate array types includes means for providing stage carry output signals thereby allowing direct interconnection of a plurality of multiply pipeline building blocks.

4. The invention as set forth in claim 3 wherein the second gate array type further includes latching means which are directly connected to said adder circuit.

5. The multiply pipeline building block as set forth in claim 2 wherein each gate array in said multiple ranks of multiply gate arrays of identical gate arrays of a first gate array type comprises:
   a. forming means including a tree of carry-save adders for forming a six-bit by six-bit square slice of the parallelogram of logical products formed in a binary multiplication;
   b. input means connected to said forming means which includes eleven bits of multiplicand and six bits of a multiplier for application to said forming means; and
   c. output means connected to the output of said forming means which includes a six-bit word sum and a six-bit carry word, wherein logical products are formed at the inputs of the first level of said carry-save adders of said tree.

6. The multiply pipeline building block as set forth in claim 2 wherein said single rank adder tree/register gate array of the second gate array type includes an adder circuit capable of summing four numbers and producing two numbers as a result.

7. The invention as set forth in claim 6 wherein the second gate array type further includes means for providing carries which do not ripple more than one bit position thereby minimizing propagation delay.

8. A multiply pipeline building block circuit with parity formed on a single circuit chip, a plurality of said chips capable of being interconnected to form the multiply pipeline, each chip comprising:
   a. multiplication circuitry for receiving a multiplier and a multiplicand;
   b. a plurality of parity generating circuits each coupled to said multiplication circuitry for explicitly generating internally to the circuit chip, parity signals; and
   c. parity checking circuits further connected to said multiplication circuitry for checking parity internally to said circuit chip.

9. The invention as set forth in claim 8 wherein said parity generating and checking means includes intercoupling means connecting said parity checking and generating means to the multiplication circuitry to enable the generating and checking of a parity carry signal for providing detection of single-bit errors in the multiplication circuitry wherein by providing output carry parity on said circuit chip, all single-bit errors, except those caused by on-chip gate faults, will be detected.

10. A multiply pipeline gate array with parity generating and checking capabilities to be used as a building block in a binary digital multiplier circuit comprising:
   a. forming means, including a tree of carry-save adders for forming a multiple bit by multiple square slice of the parallelogram of logical products formed in a binary multiplication;

FIG. 6A through FIG. 6E, when arranged as shown in FIG. 6, further clearly illustrates how the Carry outputs from each of the Lower Ranks $\phi$ and 1 are, in effect, left-shifted before being fed forward to the Upper Rank. Several important points should also be noted. The first point is that bit 1 of the Carries is not connected to any subsequent logic for any of the ranks. This is because these Carry bits will always be zero if the multiply array is connected in this scheme. If these bits were non-zero, the product would be forced to be one bit wider than is mathematically possible for a given rank. Another point is that the Stage Carries out of the left end of any given rank are also left unconnected for the same reason. The relationship of the Lower Ranks $\phi$ and 1 to the Upper Rank and to each other is also clearly shown. The Lower Ranks $\phi$ and 1 are offset from each other by six bit positions, since each takes a separate but adjacent six-bit slice of the Multiplier. Each of the Lower Ranks $\phi$ and 1 takes identical Multiplicand connections as shown. The scheme of these connections will be better understood when studying FIG. 7.

FIG. 7 shows a chart of how the partial products are formed in each of the Lower Ranks and the necessary Multiplier and Multiplicand connections for the 12-bit by 12-bit multiplier of FIG. 6A through 6E. This chart can be extended to show the necessary connections for a 12-bit by n-bit multiplier where n is a multiple of 6. Note that this chart is reversed top-for-bottom with respect to the logical connection scheme of FIG. 6A through 6E, to present its information in a natural mathematical sense.

FIG. 7 illustrates how the multiplication operation may be thought of as taking shifted copies of the Multiplicand 710, ANDing each of the shifted copies with a particular bit of the Multiplier 712, and summing the resultant logical products. Each of the six-bit square areas 714, 716, 718, 720, 722, 724 outlined in FIG. 7 represents the area of logical products covered by a single 6-bit by 6-bit multiply chip. By inspecting the center square 716 of the top row, the need for eleven different bits of Multiplicand to be applied to each multiply chip is clear. Note that roughly one-half of each of the end multiply chips is wasted due to zero-filling. As the width of the Multiplicand increases, the fraction of the multiplication array wasted due to zero-filling decreases proportionally.

Figure 8B:
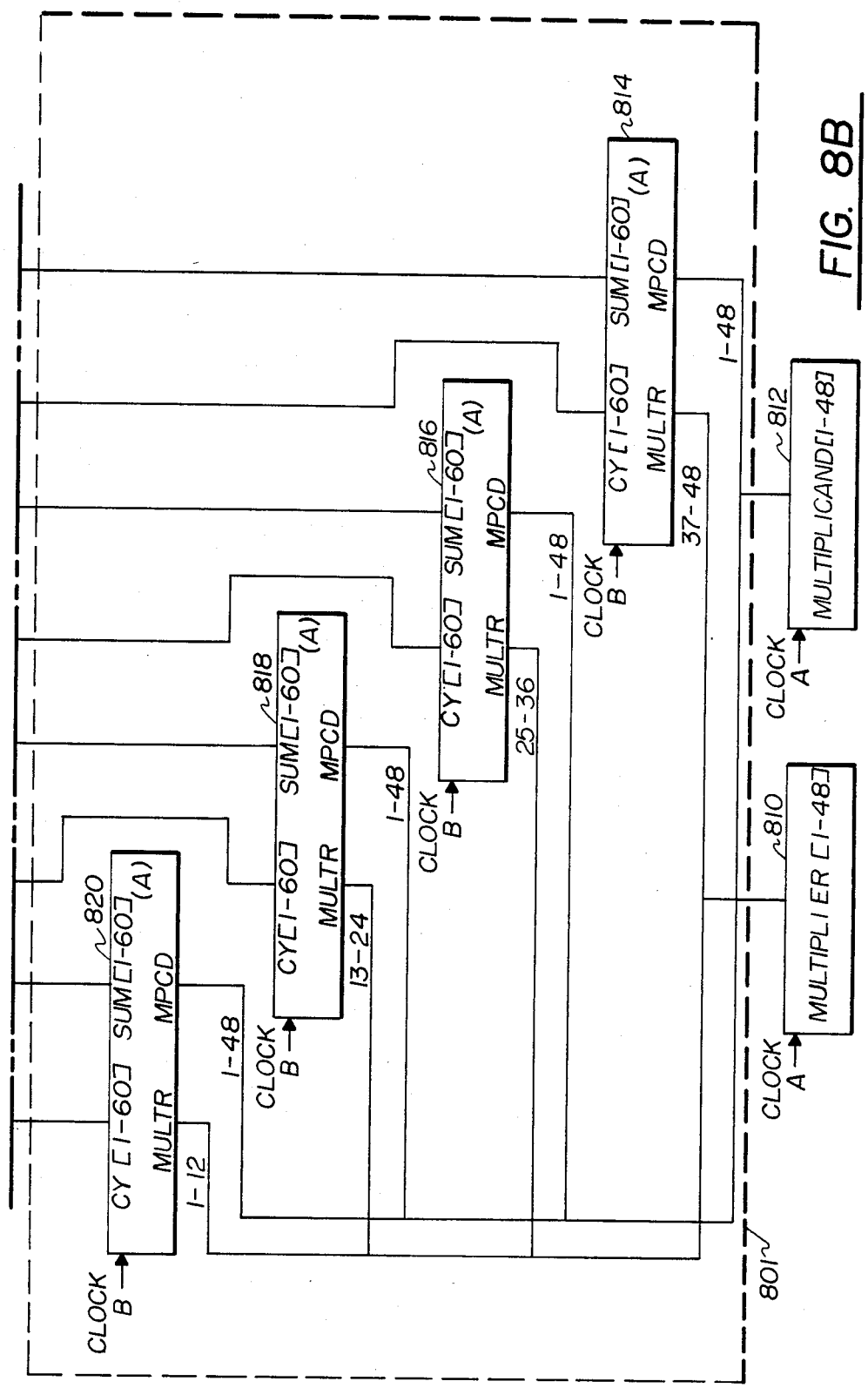

FIG. 8A and FIG. 8B, when positioned as shown in FIG. 8, when taken together diagrams the use of a 12-bit by 48-bit multipliers, adder tree/registers, and full binary adders to form a 48-bit by 48-bit multiplication pipeline. The pipeline implementation shown is designed to multiply a 48-bit Multiplier 810 and a 48-bit Multiplicand 812 to form a 96-bit Product. Since this is a pipeline, a new Product may be formed at the clock cycle rate of the pipeline. There are four structure types identified besides the latch registers holding the Multiplier, Multiplicand, and Product previously described.

Each of the first structure type A's included in dotted area 801 consists of two ranks of 6-bit by 6-bit multiply circuit chips and one rank of 6-bit by 4-bit adder/register chips as shown in FIG. 1 and FIG. 6A through 6E. There are four copies of structures type A, 814, 816, 818, 820, all sharing the same multiplier and Multiplicand registers 810, 812. The ranks of multiply circuit chips are nine chips wide, and the rank of adder/register chips is ten chips wide. These structures form the original 48 partial product rows, and reduce them to 8 partial product rows.

Each of the second structure type B's included in dotted area 802 consists of a rank of twelve 6-bit by 4-bit adder/register chips, interconnected as shown in FIG. 6A through 6E. These structures reduce the 8 rows of partial products to 4 rows. Structure type C 826 shown in dotted area 803 is a similar arrangement of sixteen adder/register chips, and reduces the 4 remaining partial product rows to 2 rows.

Structure type D, 828 shown in dotted area 804 is an ordinary full binary adder, which reduces the two remaining partial products to the final product.

Note that the Carries are left-shifted by one position as they are fed forward and that none of the highest-order Carries are connected as discussed earlier. Also observe that the A type structures are offset from each other by twelve bits since each takes a separate twelve-bit slice of the Multiplier. Although error detection logic is not shown in this figure, it may easily be extended from the schemes shown in FIG. 1 and FIG. 6A through FIG. 6E by those skilled in this art.

In summary, the inputs to a multiplier consists of a 12-bit multiplier (MULTR) and an n-bit multiplicand (MPCD); outputs consist of an n+12 bit sum word (SUM) and an n+12 bit carry word (CY). Parity is included with all input and output data.

Ranks $\phi$ and 1 gate arrays each consist of (n+6)/6 chips, and perform n-bit X 6-bit multiplies. Outputs consist of an n+6 bit sum word and an n+6 bit carry word, and the parity of all carries generated ($P_{IOC}$).

The higher rank of gate arrays consists of (n+12)/6 chips, and sums four n+12 bit input words resulting in an n+12 bit sum word and an n+12 bit carry word, which are then latched. Parity of the internal carries ($P_{IC}$) and of the output carry word ($P_{OC}$) are also provided.

The inputs to the higher rank of gate arrays consists of the sum and carry outputs of ranks $\phi$ and 1 of lower gate arrays. The outputs of rank $\phi$ are logically shifted left six positions relative to those from rank 1 before being fed to the next higher rank.

The sum and carry words from this higher rank may be summed using a full binary adder to completely resolve the n+12 bit product. If a multiplier of arbitrary size is desired, subsequent ranks of these chips followed by a full binary adder may be used.

The scheme for checking the parities of the outputs of the multiplier was also presented. Let $P_X$ represent the parity of X.

For the outputs of rank $\phi$ of the lower gate arrays:

---

$P_{SUM\phi} = (P_{MULTR[1..6]} \cdot P_{MPCD}) \oplus P_{IC_0}$
(IC = INTERNAL CARRIES)
$P_{CY\phi} = P_{OC\phi}$ (OC = OUTPUT CARRIES)
$P_{SUM_1} = (P_{MULTR[7..12]} \cdot P_{MPCD}) \oplus P_{IC_1}$
$P_{CY_1} = P_{OC}$
For the rank of upper gate arrays:
$P_{SUM} = P_{SUM\phi} \oplus P_{CY\phi} \oplus P_{SUM_1} \oplus P_{CY_1} \oplus P_{IC}$
$\quad = (P_{MULTR} \cdot P_{MPCD}) \oplus P_{IC\phi} \oplus P_{OC\phi} \oplus P_{IC_1} \oplus P_{OC_1} \oplus P_{IC}$
$\quad = (P_{MULTR} \cdot P_{MPCD}) \oplus P_{AC\phi} \oplus P_{AC_1} \oplus P_{IC}$
(AC = All (INTERNAL and OUTPUT) CARRIES)
$P_{CY} = P_{OC}$

---

The carry parity (internal or output) is not predictable at any point, but is generated directly from the carries inside each circuit chip. Parity may be generated directly from data using a parity generator (PG) and b. input means connected to said forming means which includes multiple bits of a multiplicand and multiple bits of a multiplier for application to said forming means;
c. output means connected to said forming means for providing a multiple bit word sum and a multiple bit word carry, wherein logical products are formed for entrance into said carry-save adders of said tree; and
d. parity generating and checking means coupled to said tree of carry-save adders for generating and checking a parity carry signal and for providing detection of single-bit errors in the multiply pipeline gate array wherein by providing output carry parity from said multiply pipeline gate array, all single-bit errors will be detected.

11. The invention as set forth in claim 10 wherein said multiple bits of said square slice of the parallelogram is a six-bit by six-bit slice.

12. The invention as set forth in claim 10 wherein said multiple bits of the multiplicand comprise eleven bits and said multiple bits of said multiplier comprise six bits.

13. The invention as set forth in claim 10 wherein said multiple bit word sum is a six-bit word and said multiple bit carry word is also a six-bit word.

14. The invention as set forth in claim 10 wherein said multiply with parity gate array is a six by six multiply with parity gate array.

* * * * *